US011427173B2

(12) United States Patent
Shindo

(10) Patent No.: US 11,427,173 B2
(45) Date of Patent: Aug. 30, 2022

(54) BRAKING FORCE CONTROL APPARATUS FOR A VEHICLE

(71) Applicant: Toyota Jidosha Kabushiki Kaisha, Toyota (JP)

(72) Inventor: Junya Shindo, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 16/808,883

(22) Filed: Mar. 4, 2020

(65) Prior Publication Data

US 2020/0282964 A1    Sep. 10, 2020

(30) Foreign Application Priority Data

Mar. 7, 2019 (JP) .............................. JP2019-041920

(51) Int. Cl.
*B60T 8/17* (2006.01)
*B60T 8/176* (2006.01)
*B60T 7/12* (2006.01)

(52) U.S. Cl.
CPC ................ *B60T 8/176* (2013.01); *B60T 7/12* (2013.01); *B60T 2270/10* (2013.01)

(58) Field of Classification Search
CPC ........ B60T 8/176; B60T 7/12; B60T 2270/10; B60T 2270/402; B60T 7/042; B60T 8/17616; B60T 8/4081; B60T 8/88; B60T 8/885; B60T 13/146; B60T 13/686; B60T 17/22; B60T 13/662
See application file for complete search history.

(56) References Cited

U.S. PATENT DOCUMENTS

| 5,129,713 A * | 7/1992 | Matsuda | ................... B60T 8/88 340/636.15 |
| 2008/0054716 A1 * | 3/2008 | Sato | ........................ B60T 7/042 701/70 |
| 2019/0106090 A1 * | 4/2019 | Kato | ..................... B60T 13/686 |
| 2019/0106091 A1 * | 4/2019 | Kato | ..................... B60T 17/221 |

(Continued)

FOREIGN PATENT DOCUMENTS

| JP | 2006-327474 A | 12/2006 |
| JP | 2012-153266 A | 8/2012 |

(Continued)

*Primary Examiner* — Joseph J Dallo
(74) *Attorney, Agent, or Firm* — Dinsmore & Shohl LLP

(57) ABSTRACT

A control unit for controlling an upstream braking actuator for generating upstream pressure and a downstream braking actuator for controlling braking pressures of four wheels using the upstream pressure is configured to, when a braking pressure of any wheel cannot be reduced, perform backup control so that the target upstream pressure becomes the target braking pressure of the relevant wheel, and is configured to, when performing anti-skid control in a situation where automatic braking and backup control are being performed, control the target upstream pressure such that the target upstream pressure becomes a target upstream pressure for the automatic braking when the target upstream pressure is the target braking pressure for the relevant wheel, and such that the target upstream pressure becomes the target braking pressure for the anti-skid of the relevant wheel when the target upstream pressure is not the target braking pressure of the relevant wheel.

2 Claims, 6 Drawing Sheets

(56) References Cited

U.S. PATENT DOCUMENTS

2019/0152458 A1* 5/2019 Akahane .............. B60T 13/145
2020/0282963 A1* 9/2020 Kato ..................... B60T 8/175
2020/0282964 A1* 9/2020 Shindo ................. B60T 17/22

FOREIGN PATENT DOCUMENTS

WO  WO-2018061750 A1 *  4/2018  .......... B60R 16/033
WO  WO-2020184297 A1 *  9/2020  .......... B60W 30/09
WO  WO-2021172464 A1 *  9/2021

* cited by examiner

BRAKING FORCE CONTROL APPARATUS FOR A VEHICLE

CROSS-REFERENCE TO RELATED APPLICATION

This application claims priority to Japanese Patent Application No. JP2019-41920 filed on Mar. 7, 2019, the content of which is hereby incorporated by reference in its entirety into this application.

BACKGROUND

1. Technical Field

The present disclosure relates to a braking force control apparatus for a vehicle such as an automobile.

2. Description of the Related Art

For example, as described in Japanese Patent Application Laid-open No. 2012-153266, a braking force control apparatus having an upstream braking actuator, a downstream braking actuator, and a control unit that controls these actuators is known. The upstream braking actuator includes a master cylinder device that is driven by braking operation of a driver, and generates a common upstream pressure for left and right front wheels and left and right rear wheels. The downstream braking actuator includes a pressure increasing-holding valve and a pressure reducing valve provided corresponding to each wheel, and uses the upstream pressure to control a braking pressure supplied to a braking force generator of each wheel by the pressure increasing-holding valve and the pressure reducing valve.

Even in a vehicle equipped with a braking force control apparatus having an upstream braking actuator and a downstream braking actuator, anti-skid control is performed so that a braking slip of each wheel does not become excessive. In the anti-skid control, a braking pressure supplied to a braking force generator of a wheel having a large braking slip is individually controlled by the corresponding pressure increasing-holding valve and pressure reducing valve.

If an abnormality occurs in the pressure increasing-holding valve or pressure reducing valve of any wheel, the braking pressure of the wheel cannot be controlled normally. In the conventional braking force control apparatus, for example, when an abnormality occurs in a pressure reducing valve of any wheel and the braking pressure of the wheel cannot be reduced, the anti-skid control is stopped. Therefore, in a situation where an amount of braking operation by a driver is excessive, it is impossible to prevent a braking slip of the wheel from becoming excessive.

Even if an abnormality occurs in the downstream braking actuator, when the abnormality is such an abnormality in which an upstream pressure can be supplied from the upstream braking actuator to the braking force generator of each wheel but a braking pressure of any wheel cannot be reduced (referred to as "specific anomaly" as necessary), the possibility of excessive braking slip of a wheel can be reduced by controlling the upstream pressure. For example, when a specific abnormality occurs in the downstream braking actuator, it is considered that a target braking pressure of a specific wheel is determined as a backup target upstream pressure, and an upstream braking actuator is controlled so that the upstream pressure becomes the backup target upstream pressure. In this case, for example, higher one of the target braking pressures of the left and right front wheels and higher one of the target braking pressures of the left and right rear wheels may be selected, and lower one of the two selected target braking pressures may be used as the backup target upstream pressure.

In a vehicle such as an automobile, automatic braking such as deceleration by an automatic driving control in which a vehicle is decelerated without requiring a driver's braking operation may be performed, and a target upstream pressure when automatic braking is performed is set to a target upstream pressure for automatic braking calculated based on a target deceleration of the automatic driving control. Even in a situation where automatic braking is being performed, when control of braking force by anti-skid control becomes required for any wheel, anti-skid control is performed such that a target braking pressure of the relevant wheel becomes a target braking pressure of the anti-skid.

In a situation where anti-skid control, automatic braking control and backup control are being performed, when a control target wheel of the anti-skid control is long-time locked, the target braking pressure of the wheel is continuously reduced to zero. As a result, the backup target upstream pressure is determined to be the target braking pressure of the control target wheel so that it becomes zero. Therefore, in such a case, by setting the target braking pressure of the control target wheel to the target upstream pressure for automatic braking and setting the backup target upstream pressure to the target braking pressure, the backup target upstream pressure can be prevented from becoming zero. In the present application, "long-time locked" means that a wheel is locked for a predetermined time or longer.

However, when there is a magnitude relationship between the target braking pressures of the front and rear wheels, a backup target upstream pressure may be inappropriately determined as will be described in detail later. That is, in a situation where the backup target upstream pressure is not the target braking pressure of the relevant wheel, when the target braking pressure of the relevant wheel is set to the target upstream pressure for automatic braking and the backup target upstream pressure is determined to be the target upstream pressure for automatic braking, the target upstream pressure is determined to be a target braking pressure other than the target braking pressures of the relevant wheel and the laterally opposite wheel.

SUMMARY

The present disclosure provides a braking force control apparatus which is improved such that a target upstream pressure for backup can be appropriately determined even when anti-skid control, automatic braking control and backup control are performed and a target wheel of anti-skid control is long-time locked According to the present disclosure, a braking force control apparatus for a vehicle is provided which has an upstream braking actuator that includes a master cylinder device driven by braking operation of a driver and controls an upstream pressure common to left and right front wheels and left and right rear wheels, a downstream braking actuator that individually controls braking pressures supplied to braking force generators of the left and right front wheels and the left and right rear wheels using the upstream pressure, and a control unit that controls the upstream braking actuator and the downstream braking actuator;

the control unit is configured to normally control the upstream braking actuator such that the upstream pressure becomes a pressure in the master cylinder device, and control the downstream braking actuator such that braking pressures of the wheels become the upstream pressure;

the control unit is configured to, when an anti-skid control start condition is satisfied for any of the wheels, perform anti-skid control for controlling the downstream braking actuator such that the braking pressure of the relevant wheel becomes a target braking pressure of the anti-skid control for keeping a degree of braking slip of the relevant wheel within a predetermined range until an anti-skid control end condition is satisfied; and the control unit is configured to perform automatic braking control in which the control unit calculates a target upstream pressure for automatic braking and target braking pressures for automatic braking of the wheels when automatic braking is required, control the upstream braking actuator such that the upstream pressure becomes the target upstream pressure for automatic braking, and control the downstream braking actuator such that the braking pressures of the wheels become the corresponding target braking pressures for automatic braking.

The control unit is configured to, when a specific abnormality occurs in the downstream braking actuator in which the upstream pressure can be supplied from the upstream braking actuator to the braking force generators of the wheels but a braking pressure of any wheel cannot be reduced, perform backup control in which the control unit selects higher one of the target braking pressures of the left and right front wheels and higher one of the target braking pressures of the left and right rear wheels, determines the lower of the two selected target braking pressures as a backup target upstream pressure, and controls the upstream braking actuator such that the upstream pressure becomes the backup target upstream pressure, and the control unit is configured to set the target upstream pressure to the backup target upstream pressure when performing the automatic braking control and the backup control.

Further, the control unit is configured to, when performing anti-skid control in a situation where the automatic braking control is being performed, set a target braking pressure of a control target wheel of the anti-skid control to a target braking pressure of the anti-skid control, and the control unit is configured to, in a situation where the anti-skid control, the automatic braking control and the backup control are being performed and the control target wheel is long-time locked, set the target braking pressure of the control target wheel to be used for determining the target upstream pressure to the target upstream pressure when the target upstream pressure is the target braking pressure of the control target wheel, and set the target braking pressure of the control target wheel used for determining the target upstream pressure to the target braking pressure of the anti-skid control when the target upstream pressure is not the target braking pressure of the control target wheel.

According to the above configuration, when a specific abnormality occurs in the downstream braking actuator, backup control is performed in which higher one of the target braking pressures of the left and right front wheels and higher one of the target braking pressures of the left and right rear wheels are selected, the lower one of the two selected target braking pressures is determined as a backup target upstream pressure, and further the upstream braking actuator is controlled such that the upstream pressure becomes the backup target upstream pressure.

When performing anti-skid control in a situation where the automatic braking control is being performed, a target braking pressure of a control target wheel of the anti-skid control is set to a target braking pressure of the anti-skid control. In a situation where the anti-skid control, the automatic braking control and the backup control are being performed and the control target wheel is long-time locked, the target braking pressure of the control target wheel used for determining the target upstream pressure is set to the target upstream pressure when the target upstream pressure is the target braking pressure of the control target wheel. On the other hand, the target braking pressure of the control target wheel used for determining the target upstream pressure is set to the target braking pressure of the anti-skid control when the target upstream pressure is not the target braking pressure of the control target wheel.

Therefore, even when the target braking pressures of the front and rear wheels have a magnitude relationship, it is possible to avoid inappropriate determination of the backup target upstream pressure, as will be described in detail later. That is, when the target upstream pressure is not the target braking pressure of the control target wheel, the backup target upstream pressure is determined with the target braking pressure of the control target wheel being set to the anti-skid target braking pressure. Therefore, it can be avoided that the target upstream pressure is inappropriately determined to be a target braking pressure other than the target braking pressures of the control target wheel and a wheel on the laterally opposite side to the control target wheel for the reason that the backup target upstream pressure is determined with the target braking pressure of the control target wheel being set to the target upstream pressure of automatic braking.

In one aspect of the present disclosure, the control unit is configured to determine that the target wheel is long-time locked when the control unit performs the anti-skid control, the automatic braking control and the backup control and a time during which a wheel speed of the target wheel is zero is equal to or greater than a reference value, and decrease the reference value when determining whether or not the target wheel is long-time locked in a situation where a wheel on the laterally opposite side to the control target wheel is long-time locked.

According to the above aspect, when it is determined whether or not the target wheel is long-time locked in a situation where the anti-skid control, the automatic braking control and the backup control are being performed and a wheel on the laterally opposite side to the control target wheel is long-time locked, the reference value is decreased. Therefore, as compared to where the reference value is not decreased, it is determined at an earlier stage that the wheel on the laterally opposite side to the control target wheel is long-time locked, and the target braking pressure of the control target wheel used for the determination of the backup target upstream pressure can be set earlier to the target upstream pressure for automatic braking. Accordingly, it is possible to reduce the possibility that due to the anti-skid control being executed on the wheel on the laterally opposite side to the control target wheel, the target braking pressure of the control target wheel becomes zero and the backup target upstream pressure is determined to be zero.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

Figure 1:
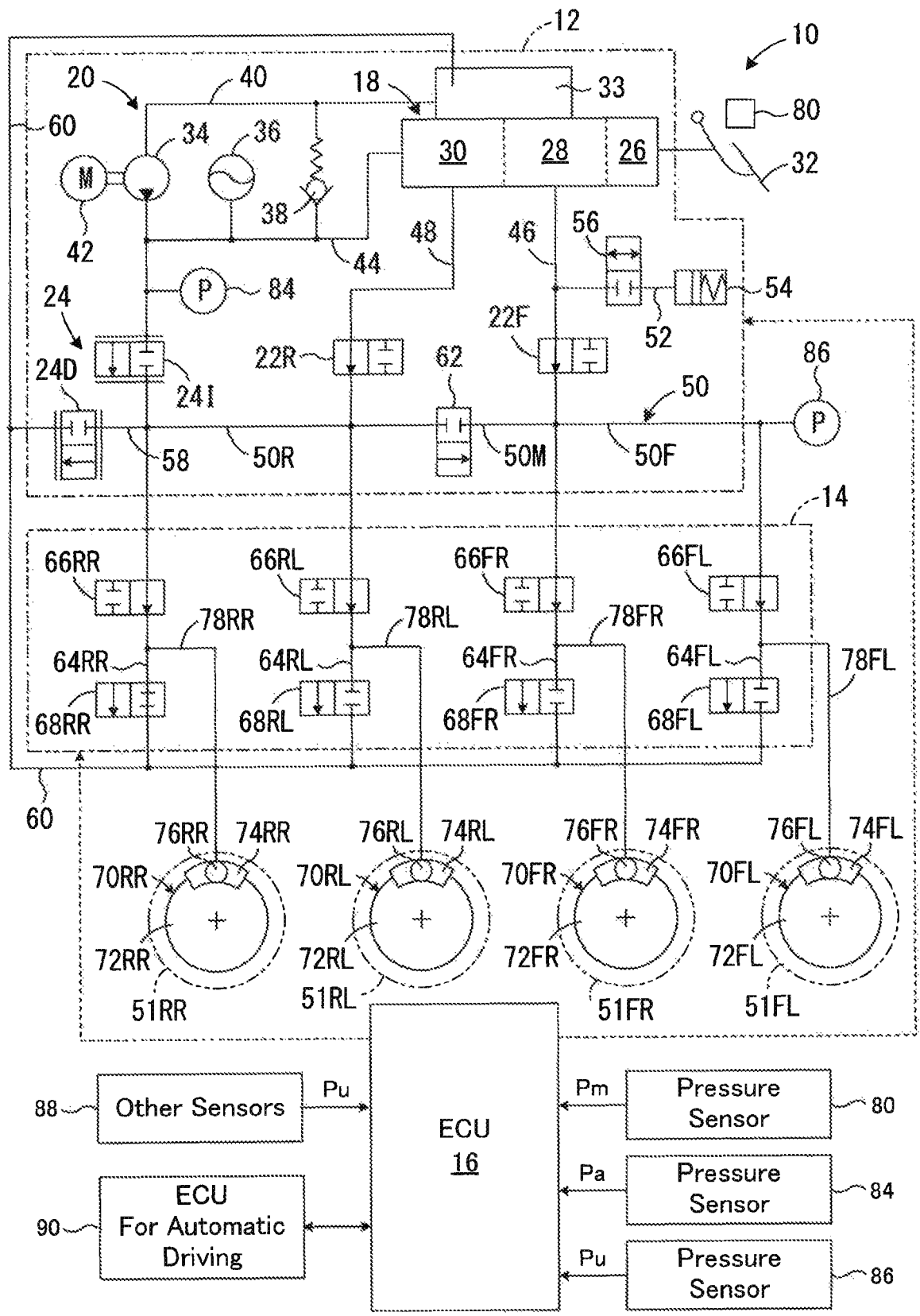
FIG. 1 is a schematic configuration diagram showing an embodiment of a vehicle braking force apparatus for a vehicle according to the present disclosure.

Although not shown in FIG. 1, a braking force control apparatus 10 according to the embodiment of the present disclosure is applied to a vehicle in which automatic braking is performed by automatic driving, as will be described later. As shown in FIG. 1, the braking force control apparatus 10 according to the embodiment of the present disclosure comprises an upstream braking actuator 12, a downstream braking actuator 14, an electronic control unit (referred to as "ECU") 16 as a braking force control unit that controls the upstream braking actuator and the downstream braking actuator. The upstream braking actuator 12 includes a master cylinder device 18 driven by braking operation of a driver, a hydraulic pressure supply source 20, master cut valves 22F and 22R, and an upstream pressure control valve 24. In FIG. 1, springs and solenoids of the valves are not shown for the purpose of simplification.

The master cylinder device 18 includes a booster 26, a master cylinder 28, and a regulator 30. A brake pedal 32 operated by the driver is connected to the booster 26, and a reservoir 33 for storing brake oil (not shown) as a working liquid is connected to the master cylinder 28 and the regulator 30. As is well known, a pressure of the regulator 30 is controlled to be substantially the same as a pressure in the master cylinder 28. Since the functions of the booster 26, the master cylinder 28 and the regulator 30 are well known by those skilled in the art, description thereof will be omitted.

The hydraulic pressure supply source 20 includes an oil pump 34, an accumulator 36 and a relief valve 38, but the accumulator may be omitted. The oil pump 34 is provided in a supply conduit 40 connected to the reservoir 33 at one end, and is driven by an electric motor 42 to pump up the brake oil from the reservoir 33 and discharge high pressure brake oil. A connection conduit 44 is connected between the supply conduit 40 on the discharge side of the oil pump 34 and the regulator 30, and the accumulator 36 is connected to the connection conduit 44. The relief valve 38 returns the brake oil in the connection conduit 44 to the supply conduit 40 on the side of the reservoir 33 with respect to the oil pump 34 when a pressure in the connection conduit 44 exceeds a preset relief pressure, whereby the pressure in the connecting conduit 44 is adjusted to be equal to or below the relief pressure.

The master cylinder 28 and the regulator 30 are connected to a supply conduit 50 common to left and right front wheels and left and right rear wheels provided in the downstream braking actuator 14 by a first supply conduit 46 and a second supply conduit 48, respectively. The master cut valves 22F and 22R are normally open electromagnetic on-off valves provided in the first supply conduit 46 and the second supply conduit 48, respectively. A stroke simulator 54 is connected to the first supply conduit 46 by a connection conduit 52, and a connection control valve 56, which is a normally closed electromagnetic on-off valve, is provided in the connection conduit 52. The connection control valve 56 is opened when the master cut valves 22F and 22R are closed, thereby allowing the driver to depress the brake pedal 32 and applying a depress reaction force to the driver via the brake pedal 32.

The upstream pressure control valve 24 includes a pressure increasing control valve 24I and a pressure reducing control valve 24D, which are normally closed electromagnetic differential pressure control valves. The other end of the supply conduit 40 is connected to the supply conduit 50, and the pressure increasing control valve 24I is provided in the supply conduit 40 on the discharge side of the oil pump 34. The supply conduit 50 is connected to a discharge conduit 60 connected to the reservoir 33 at one end by a connection conduit 58, and the pressure reducing control valve 24D is provided in the connection conduit 58. The pressure increasing control valve 24I and the pressure reducing control valve 24D may be linear solenoid valves configured to open as necessary when the master cut valves 22F and 22R are closed and each increase a valve opening amount as necessary as an energization amount to a solenoid not shown in the figure increases. As shown in FIG. 1, when the master cut valves 22F and 22R are opened and the pressure increasing control valve 24I, the pressure reducing control valve 24D and the connection control valve 56 are closed (non-control mode), the upstream braking actuator 12 sets an upstream pressure Pu to the pressure in the master cylinder 28.

When a valve opening amount of the pressure increasing control valve 24I increases, a flow rate of brake oil flowing from the hydraulic pressure supply source 20 through the supply conduit 40 to the supply conduit 50 increases, and a pressure in the supply conduit 50 increases (pressure increasing mode). On the other hand, when a valve opening amount of the pressure reducing control valve 24D increases, a flow rate of brake oil flowing from the supply conduit 50 to a discharge conduit 60 through the connection conduit 58 increases, and the pressure in the supply conduit 50 decreases (pressure reducing mode). Further, when the pressure increasing control valve 24I and the pressure reducing control valve 24D are in the closed state, the pressure in the supply conduit 50 does not change (pressure holding mode). Therefore, the upstream braking actuator 12 can control the upstream pressure Pu supplied from the upstream braking actuator to the downstream braking actuator in the pressure increasing mode, the pressure holding mode, and the pressure reducing mode in a state where the communication between the master cylinder device 18 and the downstream braking actuator 14 is cut off.

The supply conduit 50 includes a supply conduit 50F common to the left and right front wheels 51FL and 51FR and a supply conduit 50R common to the left and right rear wheels 51RL and 51RR, and a communication control valve 62 is provided in an intermediate supply conduit 50M between the supply conduits 50F and 50R. The communication control valve 62 is a normally closed electromagnetic on-off valve, which is opened when the master cut valves 22F and 22R are closed, thereby connects the supply conduit 50F common to the left and right front wheels and the supply conduit 50R common to the left and right rear wheels.

One ends of a left front wheel control conduit 64FL and a right front wheel control conduit 64FR are connected to the supply conduit 50F, and the other ends of these control conduits are connected to the discharge conduit 60. The control conduit 64FL is provided with a pressure increasing-holding valve 66FL and a pressure reducing valve 68FL for the left front wheel, and the control conduit 64FR is provided with a pressure increasing-holding valve 66FR and a pressure reducing valve 68FR for the right front wheel. Similarly, one ends of a left rear wheel control conduit 64RL and a right rear wheel control conduit 64RR are connected to the supply conduit 50R, and the other ends of these control conduits are connected to the discharge conduit 60. The control conduit 64RL is provided with a pressure increasing-holding valve 66RL and a pressure reducing valve 68RL for the left rear wheel, and the control conduit 64RR is provided with a pressure increasing-holding valve 66RR and a pressure reducing valve 68RR for the right rear wheel.

Although not shown in detail in FIG. 1, braking force generators 70FL and 70FR are provided corresponding to the left and right front wheels 51FL and 51FR, respectively, and braking force generators 70RL and 70RR are provided corresponding to the left and right rear wheels 51RL and 51RR, respectively. The braking force generators 70FL to 70RR include brake disks 72FL to 72RR, respectively that rotate together with the corresponding wheels, and brake calipers 74FL to 74RR, respectively that press brake pads, not shown, against the corresponding brake disks. The brake calipers 74FL to 74RR include wheel cylinders 76FL to 76RR, respectively, and convert the braking pressures into braking forces by changing pressing forces of the brake pads against the brake discs according to pressures of the wheel cylinders, that is, braking pressures Pwfl to Pwrr, and generate braking forces corresponding to the braking pressures. Notably, the braking force generators may be drum type braking force generators.

One end of a supply/discharge conduit 78FL is connected to the control conduit 64FL between the pressure increasing-holding valve 66FL and the pressure reducing valve 68FL for the left front wheel, and the other end of the supply/discharge conduit 78FL is connected with the wheel cylinder 76FL of the braking force generator 70FL. One end of a supply/discharge conduit 78FR is connected to the control conduit 64FR between the pressure increasing-holding valve 66FR and the pressure reducing valve 68FR for the right front wheel, and the other end of the supply/discharge conduit 78FR is connected with the wheel cylinder 76FR of the braking force generator 70FR. One end of a supply/discharge conduit 78RL is connected to the control conduit 64RL between the pressure increasing-holding valve 66RL and the pressure reducing valve 68RL for the left rear wheel, and the other end of the supply/discharge conduit 78RL is connected with the wheel cylinder 76RL of the braking force generator 70RL. Further, one end of a supply/discharge conduit 78RR is connected to the control conduit 64RR between the pressure increasing-holding valve 66RR and the pressure reducing valve 68RR for the right rear wheel, and the other end of the supply/discharge conduit 78RR Is connected with the wheel cylinder 76RR of the braking force generator 70RR.

As shown in FIG. 1, the downstream braking actuator 14 opens the pressure increasing-holding valves 66FL to 66RR and closes the pressure reducing valves 68FL to 68RR, thereby controlling the braking pressures Pwfl to Pwrr of the corresponding wheels in a pressure increasing mode. The downstream braking actuator 14 closes the pressure increasing-holding valves 66FL to 66RR and opens the pressure reducing valves 68FL to 68RR, thereby controlling the braking pressures Pwfl to Pwrr of the corresponding wheels in a pressure reducing mode. Further, the downstream braking actuator 14 closes the pressure increasing-holding valves 66FL to 66RR and closes the pressure reducing valves 68FL to 68RR, thereby controlling the braking pressures Pwfl to Pwrr of the corresponding wheels in a pressure holding mode.

In the embodiment, the pressure increasing-holding valves 66FL to 66RR are normally open type electromagnetic on-off valves, and the pressure reducing valves 68FL to 66RR are normally closed type electromagnetic on-off valves. However, the pressure increasing-holding valve and the pressure reducing valve of each wheel may be replaced with one electromagnetic valve of a 3-port 3-position switching type capable of increasing, holding and reducing the braking pressure. Further, the pressure increasing-holding valves 66FL to 66RR may each be a linear solenoid valve configured such that a valve opening amount decreases as an energization amount to a solenoid increases.

A pressure sensor 80 is provided in the upstream brake actuator 12. The pressure sensor detects a master cylinder pressure Pm which is a pressure in the master cylinder 28 or a pressure in the first supply conduit 46 between the master cylinder and the master cut valve 22F as an amount of braking operation performed by the driver. A signal indicating the master cylinder pressure Pm detected by the pressure sensor 80 is input to the ECU 16. Notably, instead of the master cylinder pressure Pm or in addition to the master cylinder pressure Pm, a pedal force Fp applied to the brake pedal 32 by the driver may be detected by a pedal force sensor as a value indicating an amount of braking operation by the driver.

A pressure sensor 84 that detects a pressure in the supply conduit 40 (accumulator pressure Pa) is connected to the supply conduit between the oil pump 34 and the pressure increasing control valve 24I. A pressure sensor 86 for detecting a pressure in the supply conduit 50F (upstream pressure Pu) is connected to the supply conduit. Signals indicating the accumulator pressure Pa and the upstream pressure Pu detected by the pressure sensors 84 and 86, respectively, are also input to the ECU 16. The ECU 16 also receives signals indicating various parameters relating to a running state of the vehicle such as wheel speeds Vwi (i=fl, fr, rl and rr) of the left and right front wheels and the left and right rear wheels from the other sensors 88. Further, as will be described later, the ECU 16 exchanges necessary information with an electronic control unit (referred to as "ECU") 90 for automatic driving.

The ECUs 16 and 90 may be, for example, microcomputers having a CPU, a ROM, a RAM, and an input/output port device, which are connected to each other by a bidirectional common bus. In particular, the ROM of the ECU 16 stores a control program for the upstream braking actuator 12 corresponding to the flowchart shown in FIG. 2 and a control program for the downstream braking actuator 14 corresponding to the flowcharts shown in FIGS. 3 and 4. As will be described in detail later, the CPU controls the upstream braking actuator 12 according to the control program for the upstream braking actuator, and controls the downstream braking actuator 14 according to the control program for the downstream braking actuator.

As will be described in detail later, the ECU 16 sets the control modes of the upstream braking actuator 12 and the downstream braking actuator 14 to the non-control modes when a braking force is not controlled by the anti-skid control for any of the wheels. Therefore, the upstream pressure Pu and the braking pressures Pbi (i=fl, fr, rl and rr) of the wheels are controlled to be the master cylinder pressure Pm.

In contrast to this, when a start condition for the braking force control by the anti-skid control is satisfied for any wheel, the ECU 16 controls the braking force of the relevant wheel by the anti-skid control until an end condition is satisfied. That is, the ECU 16 calculates a target braking pressure Pabsi (i=fl, fr, rl or rr) for keeping a braking slip ratio of the relevant wheel within a predetermined range. Further, the ECU 16 controls the downstream brake actuator 14 in the pressure reducing mode, the pressure holding mode, the pressure increasing mode and the non-control mode so that the braking pressure Pbi (i=fl, fr, rl or rr) of the relevant wheel becomes the corresponding target braking pressure Pabsi. In this situation, the upstream pressure Pu and the braking pressures Pbi of wheels other than the relevant wheel are controlled to be the master cylinder pressure Pm.

Although not shown in the drawing, the ECU 90 for automatic driving performs automatic driving control for stably driving the vehicle along a driving lane without requiring a driving operation of the driver in a manner known in the art. For example, the ECU 90 determines a lane based on information ahead of the vehicle acquired by an on-board camera, and calculates a target steered angle of the steered wheels and a target acceleration/deceleration of the vehicle for causing the vehicle to travel along the lane. The ECU 90 outputs a signal indicating the target steered angle to an ECU for steering control (not shown). When the target acceleration/deceleration is a target acceleration, the ECU 90 outputs a signal indicating the target acceleration to an ECU for drive control (not shown) and when the target acceleration/deceleration is a target deceleration, outputs a signal indicating the target deceleration to the ECU 16.

When the ECU 16 receives the signal indicating the target deceleration, it performs automatic braking by the automatic driving control. That is, the ECU 16 calculates a target upstream pressure Pau based on the target deceleration and controls the upstream braking actuator 12 so that the upstream pressure Pu becomes the target upstream pressure Pau. The ECU 16 calculates target braking forces Fati (i=fl, fr, rl and rr) of the left and right front wheels and the left and right rear wheels based on the target deceleration and a preset braking force distribution ratio for the front and rear wheels. Further, the ECU 16 calculates target braking pressures Pati (i=fl, fr, rl and rr) of the wheels for achieving the target braking forces Fati and controls the downstream braking actuator 14 so that braking pressures of the wheels becomes the corresponding target braking pressures Pati.

When the start condition of the braking force control by the anti-skid control is satisfied for any wheel in a situation where the automatic braking by the automatic operation control is being performed, the ECU 16 performs the braking force control by the anti-skid control on the relevant wheel until the end condition is satisfied. That is, the ECU 16 calculates a target braking pressure Pabsi for setting a braking slip ratio of the relevant wheel (control target wheel) within a predetermined range, and controls the downstream braking actuator 14 so that a braking pressure Pbi of the relevant wheel becomes the corresponding target braking pressure Pabsi. In this situation, the upstream pressure Pu is controlled to be the target upstream pressure Pau, and braking pressures Pbi of wheels other than the relevant wheel are controlled to be the target braking pressure Pati.

Further, in the embodiment, when a braking pressure cannot be reduced, such as when the pressure reducing valve of any wheel is kept closed and the valve cannot be opened, it is determined that the downstream braking actuator 14 is in a specific abnormality. Notably, in a braking force control apparatus in which a braking pressure is reduced by suction of an oil pump, it is determined that the downstream braking actuator 14 is in a specific abnormality even when the oil pump or an electric motor that drives the oil pump is abnormal.

When the downstream braking actuator 14 is in a specific abnormality, control of the upstream pressure Pu when the downstream braking actuator 14 is in a specific abnormality (referred to as "backup control") is performed according to the control program for the upstream braking actuator 12. That is, the target upstream pressure Put is determined according to the following equation (1) based on the target braking pressures Pbti of the wheels, and the upstream braking actuator 12 is controlled in the pressure reducing mode, the pressure holding mode, the pressure increasing mode and the non-control mode so that an upstream pressure Pu becomes the target upstream pressure Put. Notably, the backup control may be executed when the downstream braking actuator 14 is in a specific abnormality in a situation where the automatic braking by the automatic driving control is being performed, but even if the downstream braking actuator 14 is in a specific abnormality, the backup control may not be executed when automatic braking by the automatic control is not being performed.

$$\text{Target upstream pressure Put}=\text{LO}(\text{HI}(\text{left front wheel},\text{right front wheel}),\text{HI}(\text{left rear wheel},\text{right rear wheel})) \quad (1)$$

In the above equation (1), HI means that the higher one of the target braking pressures Pbti of the two wheels in the parentheses is selected, and LO means that the lower one of the target braking pressure Pbti of the two wheels in the parentheses is selected. When the two target braking pressures to be selected are the same, the same target braking pressure is selected.

Therefore, the upstream pressure Pu is controlled to be the target upstream pressure Put shown in Table 1 below. In Table 1 and Table 2 described later, "OFF" means that the corresponding control Is not executed, and "ON" means that the corresponding control is executed.

| | | | | |
|---|---|---|---|---|
| Automatic Braking | OFF | OFF | ON | ON |
| Backup Control | OFF | ON | OFF | ON |
| Upstream Pressure | Pm | Put | Pau | Put |

The braking pressures Pbi of the wheels used for the determination of the target upstream pressure Put performed according to the above equation (1) are as shown in Table 2 below. In Table 2, "Control Target Wheel" is a wheel whose braking pressure is controlled by the braking force control by anti-skid control, and a target braking pressure Pbti of "Long-time Lock" is a target braking pressure when the control target wheel is determined to be long-time locked. Although not shown in Table 2, when no braking force is controlled by anti-skid control for any wheel, braking pressures of the wheels are controlled as those of the other wheels in Table 2 (other than the control target wheel).

| | | Automatic Braking | | | |
|---|---|---|---|---|---|
| | | OFF | OFF | ON | ON |
| | | | Backup Control | | |
| | | OFF | ON | OFF | ON |
| Target Braking Pressure Pbti | Control Target Wheel | Pabsi | Pabsi | Pabsi | Pabsi |
| | Long-time Lock | Pm | Pm | Pau (Note 1) | Pau Pabsi (Note 2) |
| | Other Wheels | Pm | Pm | Pati | Pati |

As shown in Table 2, when it is determined that the control target wheel is long-time locked in a situation where the automatic braking is not performed, the target braking pressure Pbti of the relevant wheel is set to the master cylinder pressure Pm. On the other hand, when it is determined that the control target wheel is long-time locked in a situation where the automatic braking is being performed, the target braking pressure Pbti of the relevant wheel is controlled to become the target upstream pressure Pau determined based on the target deceleration (Note 1). However, even if it is determined that the control target wheel is long-time locked in a situation where the automatic braking is being performed, when the target braking pressure of the relevant wheel is not the target braking pressure determined to be the target upstream pressure Put, the target braking pressure Pbti of the relevant wheel is set to the target braking pressure Pabsi of the anti-skid control, similarly to the target braking pressures of wheels other than the control target wheel (other wheels) (Note 2).

<Control of the Upstream Braking Actuator 12>

Figure 2:
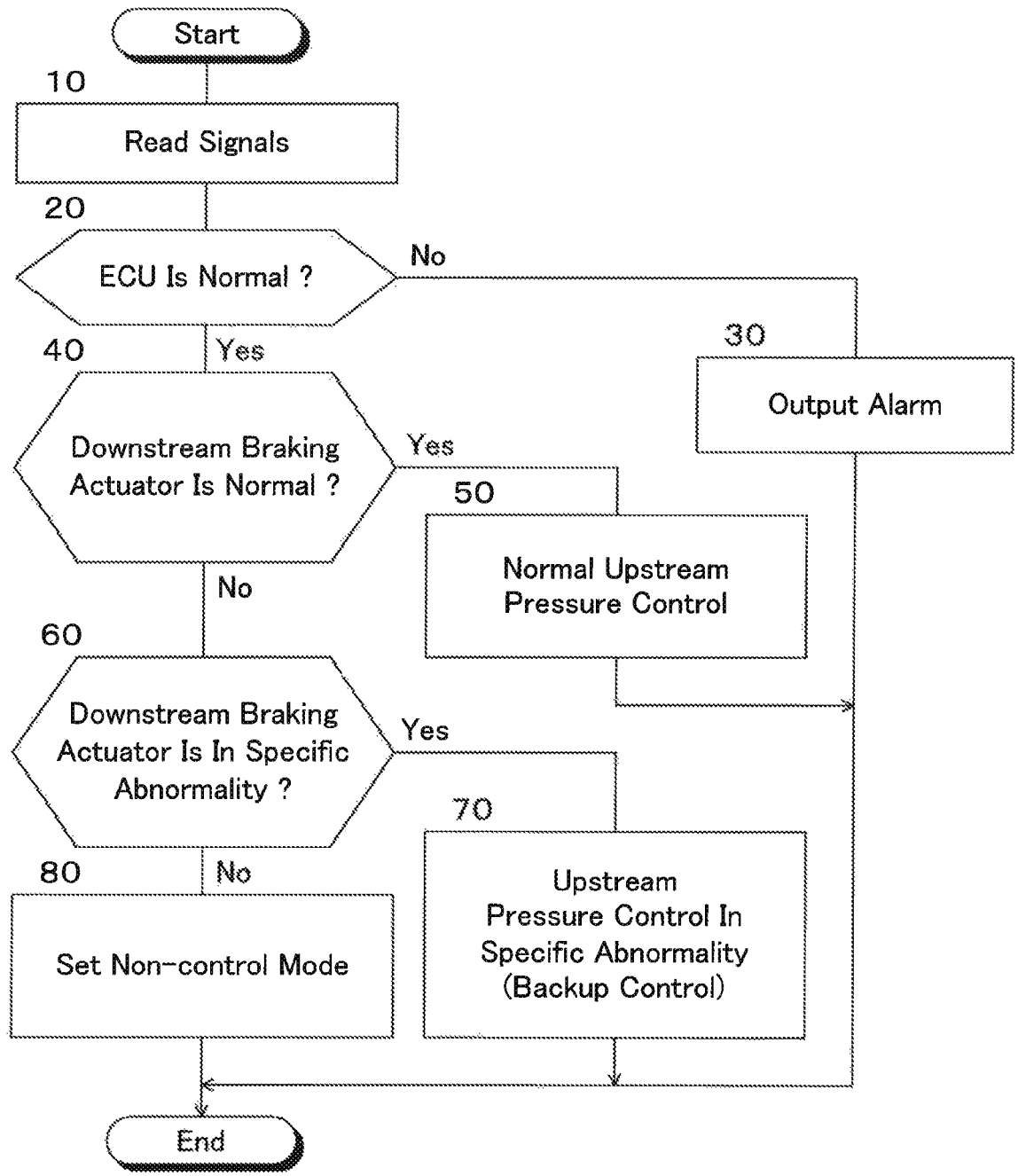
FIG. 2 is a flowchart showing a control routine of an upstream braking actuator in the embodiment.

Next, the control routine of the upstream braking actuator 12 in the embodiment will be described with reference to the flowchart shown in FIG. 2. The control according to the flowchart shown in FIG. 2 is repeatedly executed at predetermined time intervals when an ignition switch (not shown) is ON. In the following description, the control of the upstream braking actuator according to the flowchart shown in FIG. 2 is simply referred to as "the upstream control".

First, in step 10, signals indicating a master cylinder pressure Pm detected by the pressure sensor 80 and the like are read. In step 20, a determination is made as to whether or not the ECU 16 is normal. When an affirmative determination is made, the upstream control proceeds to step 40, and when a negative determination is made, the upstream control proceeds to step 30.

In step 30, an alarm device not shown in FIG. 1 is activated to output an alarm indicating that the ECU 16 is abnormal.

In step 40, a determination is made as to whether or not the downstream braking actuator 14 is normal. When a negative determination is made, the upstream control proceeds to step 60, and when an affirmative determination is made, the upstream control proceeds to step 50. For example, when the pressure increasing-holding valve of any wheel is kept closed and not opened, when the pressure reducing valve is kept opened and not closed, or when the pressure reducing valve is kept closed and not opened, the downstream braking actuator 14 is determined not to be normal.

In step 50, the upstream pressure Pu is controlled normally. When the automatic braking by the automatic driving control is not being performed, the upstream braking actuator 12 is controlled in the non-control mode by not supplying control current to the valves and the motor 42. That is, the master cut valves 22F and 22R are opened, and the connection control valve 56, the communication control valve 62, the pressure increasing control valve 24I, and the pressure reducing control valve 24D are kept closed. Furthermore, the pump 34 is stopped. Therefore, the master cylinder pressure Pm is supplied to the downstream braking actuator 14 as the upstream pressure Pu.

On the other hand, when the automatic braking by the automatic driving control is being performed, the master cut valves 22F and 22R are closed, the connection control valve 56 and the communication control valve 62 are opened, and the oil pump 34 is driven so that an accumulator pressure Pa becomes a pressure within the preset range. Further, a target upstream pressure Pau is calculated based on the target deceleration of the vehicle for the automatic braking by the automatic driving control, and the pressure increasing control valve 24I and the pressure reducing control valve 24D are controlled so that an upstream pressure Pu supplied to the downstream braking actuator 14 becomes the target upstream pressure Pau. The target upstream pressure Pau is calculated to a value equal to or higher than the target braking pressures Pati (i=fl, fr, rl and rr) of the wheels for the automatic braking by the automatic driving control described later.

In step 60, a determination is made as to whether or not the downstream braking actuator 14 is in a specific abnormality. When a negative determination is made, the upstream control proceeds to step 80, and when an affirmative determination is made, the upstream control proceeds to step 70.

In step 70, control of the upstream pressure Pu when the downstream braking actuator 14 is in a specific abnormality (backup control) is performed. That is, according to the above equation (1), the higher one of the target braking pressures of the left and right front wheels and the higher one of the target braking pressures of the left and right rear wheels are selected, and the lower one of the two selected target braking pressures is determined as the target upstream pressure Put. Further, the upstream braking actuator 12 is controlled so that an upstream pressure Pu becomes the target upstream pressure Put. Note that an alarm device that is not shown in FIG. 1 may be activated to output an alarm indicating that the downstream braking actuator 14 is in a specific abnormality.

In step 80, as in step 50, the upstream braking actuator 12 is controlled in the non-control mode. Note that an alarm indicating that the downstream braking actuator 14 is in an abnormality other than a specific abnormality may be output by operating an alarm device not shown in FIG. 1.

<Control of Downstream Braking Actuator 14>

Figure 3:
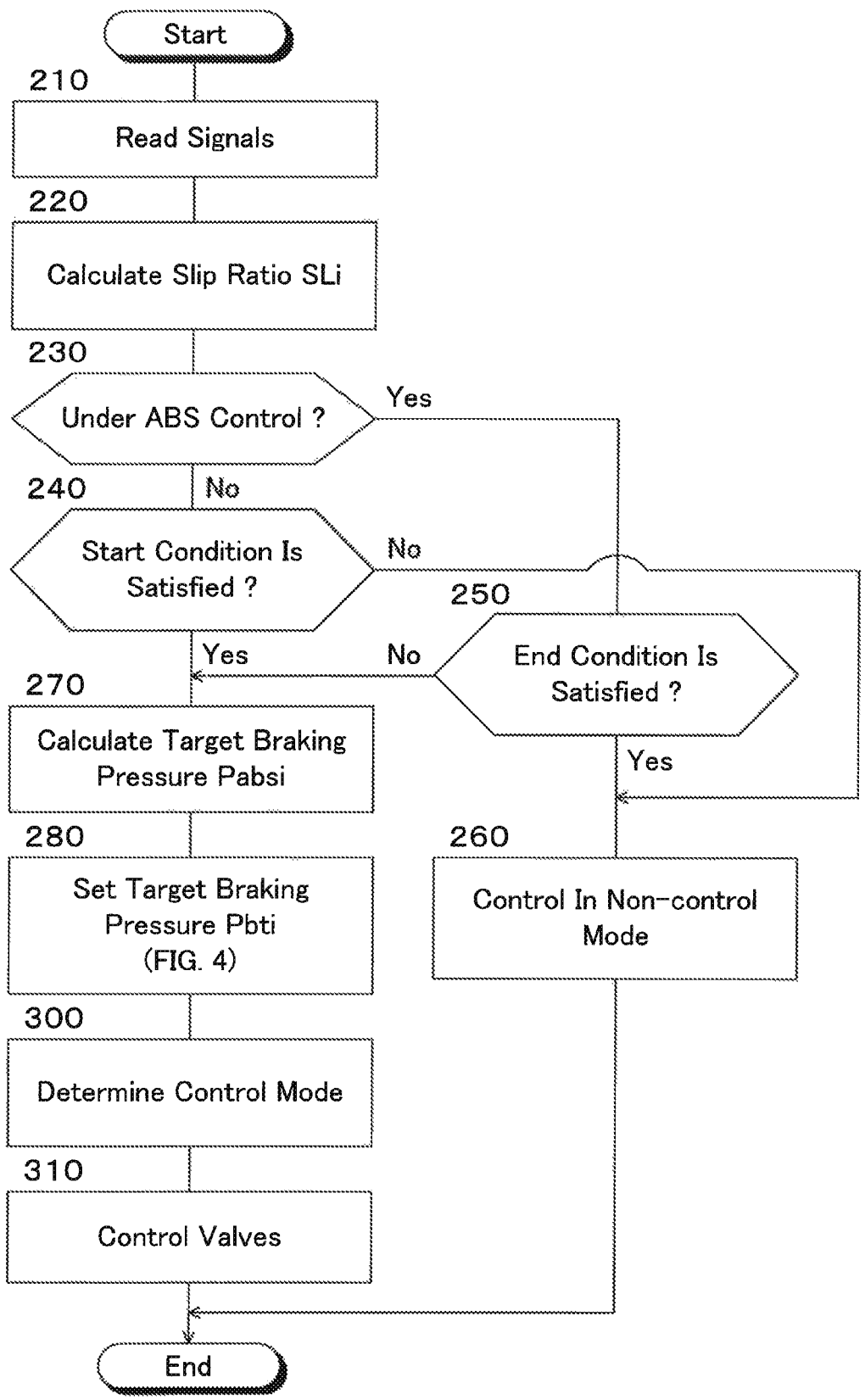
FIG. 3 is a flowchart showing a control routine of a downstream braking actuator in the embodiment.
Figure 4:
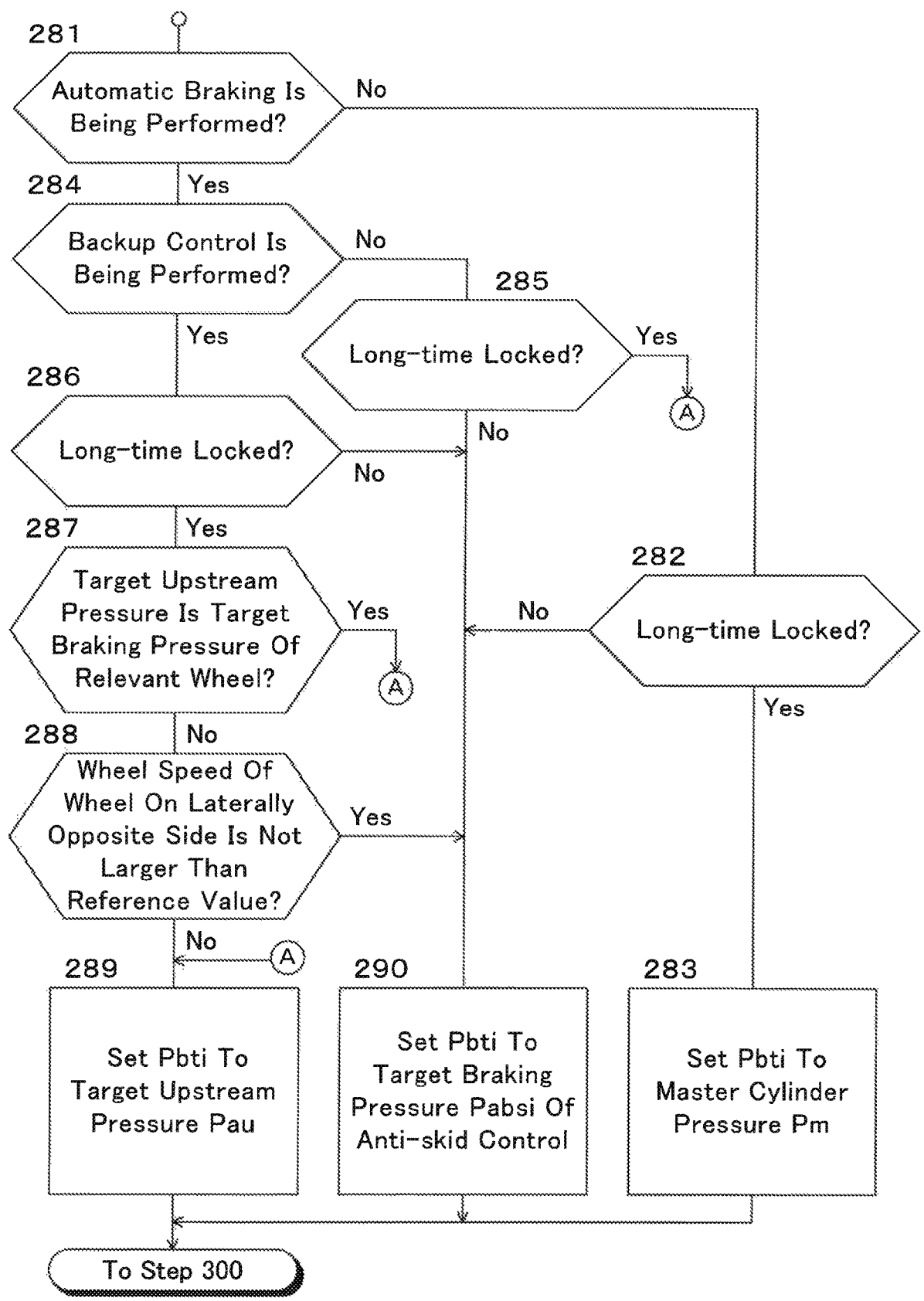
FIG. 4 is a flowchart showing a subroutine for setting a target braking pressure Pbti, which is executed in step 280 of the flowchart shown in FIG. 3.

Next, a control routine for the downstream braking actuator 14 in the embodiment will be described with reference to the flowcharts shown in FIGS. 3 and 4. The control according to the flowcharts shown in FIGS. 3 and 4 is repeatedly executed in the order of, for example, the left front wheel 51FL, the right front wheel 51FR, the left rear wheel 51RL and the right rear wheel 51RR at predetermined time intervals when the ignition switch (not shown) is ON. In the following description, the control of the downstream braking actuator according to the flowcharts shown in FIGS. 3 and 4 is simply referred to as "the downstream control".

First, in step 210, signals indicating wheel speeds Vwfl, Vwfr, Vwrl and Vwrr of the left front wheel 51FL, right front wheel 51FR, left rear wheel 51RL and right rear wheel 51RR detected by the wheel speed sensors and the like are read.

In step 220, an estimated vehicle body speed Vb is calculated based on the wheel speeds Vwi (i=fl, fr, rl and rr) in a manner known in the art. In addition, a braking slip ratio SLi (i=fl, fr, rl or rr) of the relevant wheel is calculated based on the estimated vehicle body speed Vb and the wheel speed Vwi of the relevant wheel.

In step 230, a determination is made as to whether or not the braking force is controlled by the anti-skid control for the relevant wheel. When an affirmative determination is made, the downstream control proceeds to step 250, and when a negative determination is made, the downstream control proceeds to step 240.

In step 240, a determination is made as to whether or not a start condition for starting braking force control by the anti-skid control is satisfied for the relevant wheel. For example, it is determined whether or not the estimated vehicle body speed Vb is equal to or greater than a control start reference value Vbs (a positive constant) and the braking slip ratio SLi of the relevant wheel is equal to or greater than a reference value SLo (a positive constant). When a negative determination is made, the downstream control proceeds to step 260, and when an affirmative determination is made, the downstream control proceeds to step 270.

In step 250, a determination is made as to whether or not an end condition for terminating braking force control by the anti-skid control is satisfied for the relevant wheel. For example, it is determined that the end condition is satisfied when the estimated vehicle body speed Vb is equal to or lower than a control end reference value Vbe (a positive constant) or when the master cylinder pressure Pm is equal to or lower than a control end pressure reference value (a positive constant). When a negative determination is made, the downstream control proceeds to step 270, and when an affirmative determination is made, the downstream control proceeds to step 260.

In step 260, the downstream braking actuator 14 is controlled in the non-control mode. That is, the pressure increasing-holding valve 66FL, 66RR, 66RL or 66RR of the relevant wheel is controlled to the open position, and the pressure reducing valve 68FL, 68RR, 68RL or 68RR of the relevant wheel is controlled to the closed position. Therefore, the braking pressure Pbi of the relevant wheel is controlled to the master cylinder pressure Pm.

Note that when the automatic braking by the automatic driving control is performed, the target braking pressures Pati of the wheels are calculated based on the target deceleration of the vehicle for the automatic braking by the automatic driving control as described above. Further, the downstream braking actuator 14 is controlled so that braking pressures Pbi of the wheels become the corresponding target braking pressures Pati.

In step 270, a target braking pressure Pabsi (i=fl, fr, rl or rr) of the relevant wheel for setting a braking slip ratio SLi of the relevant wheel to a value within a predetermined range is calculated based on the braking slip ratio in a manner known in the art.

In step 280, a target braking pressure Pbti (i=fl, fr, rl, or rr) of the relevant wheel is set as will be described later according to the flowchart shown in FIG. 4. When step 280 is complete, downstream control proceeds to step 300.

In step 300, a determination is made as to whether the control mode for setting the braking pressure Pbi of the relevant wheel to the corresponding target braking pressure Pbti is the pressure increasing mode, the pressure holding mode, or the pressure reducing mode.

In step 310, the pressure increasing-holding valve 66FL, 66RR, 66RL or 66RR or the pressure reducing valve 68FL, 68RR, 68RL or 68RR of the wheel to be controlled based on the control mode is specified. Further, a target duty ratio Dti (i=fl, fr, rl or rr) of a valve to be controlled is calculated based on a present braking pressure Pbi and the target braking pressure Pbti of the relevant wheel, and by controlling the valves according to the target duty ratio Dti, the braking pressure Pbi of the relevant wheel is controlled to be the corresponding target braking pressure Pbti. The present braking pressure Pbi may be estimated based on, for example, a history of increasing/decreasing of the braking pressure.

<Setting of Target Braking Pressure Pbti>

Next, with reference to the flowchart shown in FIG. 4, the routine for setting the target braking pressure Pbti executed in step 280 will be described.

In step 281, a determination is made as to whether or not the automatic braking by the automatic operation control is being performed. When an affirmative determination is made, the downstream control proceeds to step 284, and when a negative determination is made, the downstream control proceeds to step 282.

In step 282, a determination is made as to whether or not a situation in which the wheel speed Vwi of the relevant wheel is zero continues for a reference time To (a positive constant) or more, that is, whether or not the relevant wheel is long-time locked. When a negative determination is made, the downstream control proceeds to step 290, and when an affirmative determination is made, the target braking pressure Pbti of the relevant wheel is set to the master cylinder pressure Pm in step 283.

In step 284, a determination is made as to whether the backup control is being performed, that is, whether the control of the upstream pressure Pu when the downstream brake actuator 14 is in a specific abnormality is being performed. When an affirmative determination is made, the downstream control proceeds to step 286, and when a negative determination is made, the downstream control proceeds to step 285.

In step 285, as in step 282, a determination is made as to whether or not the relevant wheel is long-time locked. When an affirmative determination is made, the downstream control proceeds to step 289, and when a negative determination is made, the downstream control proceeds to step 290.

Also in step 286, as in steps 282 and 285, a determination is made as to whether or not the relevant wheel is long-time locked. When a negative determination is made, the downstream control proceeds to step 290, and when an affirmative determination is made, the downstream control proceeds to step 287. It is to be noted that the reference time T0 for determining the long-time lock in this step is set to a value smaller than a standard value, as will be described later in detail, when it is determined that a wheel on the laterally opposite side to the relevant wheel is long-time locked.

In step 287, a determination is made as to whether or not the target upstream pressure Put determined according to the above equation (1) is the target braking pressure Pbti of the relevant wheel. When an affirmative determination is made, the downstream control proceeds to step 289, and when a negative determination is made, the downstream control proceeds to step 288.

In step 288, a determination is made as to whether or not a wheel speed Vwi (i=fl, fr, rl or rr) of a wheel on the laterally opposite side to the relevant wheel is equal to or less than a reference value Vw0 (a positive constant). When an affirmative determination is made, the downstream control proceeds to step 290, and when a negative determination is made, the downstream control proceeds to step 289.

In step 289, the target braking pressure Pbti of the relevant wheel is set to the target upstream pressure Pau calculated in step 50 (target upstream pressure when the automatic braking is performed by the automatic operation control).

In step 290, the target braking pressure Pbti of the relevant wheel is set to the target braking pressure Pabsi calculated in step 270 (the target braking pressure for the anti-skid control).

<Operation of Embodiment>

Next, the operation of the braking force control apparatus 10 according to the embodiment will be described in the following various cases.

<A. When the Downstream Braking Actuator 14 is Normal (the Backup Control is not Performed)>

<A1> when the Automatic Braking is not Performed

An affirmative determination is made in step 40, so that the upstream brake actuator 12 is controlled in the non-control mode in step 50, and the master cylinder pressure Pm is supplied to the downstream brake actuator 14.

<A1-1> when the Braking Slip of the Relevant Wheel is not Excessive

In Steps 230 and 240, negative determinations are made. In Step 260, the downstream braking actuator 14 is controlled in the non-control mode, so that the braking pressure Pbi of the wheel is controlled to be the master cylinder pressure Pm.

<A1-2> when the Braking Slip of the Relevant Wheel is Excessive but the Relevant Wheel is not Long-Time Locked First, a negative determination and an affirmative determination are made in steps 230 and 240, respectively, and then an affirmative determination and a negative determination are performed in steps 230 and 250, respectively, thereby steps 270 to 310 are executed. In step 270, a target braking pressure Pabsi (a target braking pressure for the anti-skid control) for controlling the braking slip ratio SLi of the relevant wheel within a predetermined range is calculated based on the braking slip ratio.

In steps 281 and 282, negative determinations are made, and in step 290, the target braking pressure Pbti of the relevant wheel is set to the target braking pressure Pabsi for the anti-skid control of the relevant wheel. In steps 300 and 310, the braking pressure Pbi of the relevant wheel is controlled so as to become the target braking pressure Pbti (=Pabsi), thereby reducing the braking slip of the relevant wheel. The braking pressures of the other wheels are controlled to the master cylinder pressure Pm as in the case of A1-1.

<A1-3> when the Braking Slip of the Relevant Wheel is Excessive and the Relevant Wheel is Long-Time Locked As in the case of A1-2 above, first, a negative determination and an affirmative determination are made in steps 230 and 240, respectively, and then an affirmative determination and a negative determination are made in steps 230 and 250, respectively, so that steps 270 to 310 are executed.

In steps 281 and 282, a negative determination and an affirmative determination are made, respectively, and in step 283, the target braking pressure Pbti of the relevant wheel is set to the master cylinder pressure Pm. In steps 300 and 31U, the braking pressure Pbi of the relevant wheel is controlled so as to become the target braking pressure Pbti (=Pm), thereby the braking pressure Pbi is prevented from becoming zero due to the braking force control by the anti-skid control being continued. The braking pressures of the other wheels are controlled to the master cylinder pressure Pm as in the case of A1-1.

<A2> when the Automatic Braking is being Performed

Since an affirmative determination is made in step 40, the pressure increasing control valve 24I and the pressure reducing control valve 24D are controlled so that the upstream pressure Pu becomes the target upstream pressure Pau for the automatic braking in step 50, and the upstream pressure Pu corresponding to the target upstream pressure Pau is supplied to the downstream braking actuator 14.

<A2-1> when the Braking Slip of the Relevant Wheel is not Excessive

In steps 230 and 240, negative determinations are made, and step 260 is executed. That is, the target braking pressures Pati of the wheels are calculated based on the target deceleration of the vehicle for the automatic braking by the automatic driving control, and the downstream braking actuator 14 is controlled so that the braking pressures Pbi of the wheels become the corresponding target braking pressures Pati.

<A2-2> the Braking Slip of the Relevant Wheel is Excessive, but the Relevant Wheel is not Long-Time Locked Steps 270 to 310 are executed as in the case of A1-2 above. In step 270, a target braking pressure Pabsi (a target braking pressure for the anti-skid control) for controlling the braking slip ratio SLi of the relevant wheel within a predetermined range is calculated based on the braking slip ratio.

In steps 281, 284, and 285, an affirmative determination, a negative determination, and a negative determination are made, respectively, and in step 290, the target braking pressure Pbti of the relevant wheel is set to the target braking pressure Pabsi of the anti-skid control of the relevant wheel. In steps 300 and 310, the braking pressure Pbi of the relevant wheel is controlled so as to become the target braking pressure Pbti (=Pabsi), thereby reducing the braking slip of the relevant wheel. The braking pressures of the other wheels are controlled so as to be the target braking pressures Pati for the automatic braking as in the case of A2-1.

<A2-3> when the Braking Slip of the Relevant Wheel is Excessive and the Relevant Wheel is Long-Time Locked As in the case of A1-2 above, first, a negative determination and an affirmative determination are made in steps 230 and 240, respectively, and then an affirmative determination and a negative determination are made in steps 230 and 250, respectively, so that steps 270 to 310 are executed.

In steps 281, 284, and 285, an affirmative determination, a negative determination, and an affirmative determination are made, respectively, and in step 288, the target braking pressure Pbti of the relevant wheel is set to the target upstream pressure Pau for the automatic braking. In steps 300 and 310, the braking pressure Pbi of the relevant wheel is controlled so as to become the target braking pressure Pbti (=Pau), thereby preventing the braking pressure Pbi of the relevant wheel from becoming zero. The braking pressures of the other wheels are controlled so as to be the corresponding target braking pressures Pati of the automatic braking as in the case of A2-1.

<B. When the Downstream Braking Actuator 14 is in a Specific Abnormality (the Backup Control is being Performed)>

Since a negative determination and an affirmative determination are made in steps 40 and 60, respectively, the upstream pressure control (the backup control) to be executed when the relevant wheel is in a specific abnormality is performed in step 70. That is, the target upstream pressure Put is determined according to the above equation (1), and the upstream braking actuator 12 is controlled so that the upstream pressure Pu becomes the target upstream pressure Put.

<B1> when the Automatic Braking is not Performed
<B1-1> when the Braking Slip of the Relevant Wheel is not Excessive As in the case of A1-1, negative determinations are made in steps 230 and 240. Therefore, the downstream braking actuator 14 is controlled in the non-control mode in step 260, so that the braking pressure Pbi of the relevant wheel is controlled to the master cylinder pressure Pm.

<B1-2> when the Brake Slip of the Relevant Wheel is Excessive but the Relevant Wheel is not Long-Time Locked As in the case of A1-2, steps 270 to 310 are executed. In steps 281 and 282, negative determinations are made, and in step 290, the target braking pressure Pbti of the relevant wheel is set to the target braking pressure Pabsi for the anti-skid control of the relevant wheel. In steps 300 and 310, the braking pressure Pbi of the relevant wheel is controlled so as to become the target braking pressure Pbti (=Pabsi), thereby reducing the braking slip of the relevant wheel. The braking pressures of the other wheels are controlled to the master cylinder pressure Pm as in the case of B1-1.

<B1-3> when the Braking Slip of the Relevant Wheel is Excessive and the Relevant Wheel is Long-Time Locked As in the case of B1-2 above, steps 270 to 310 are executed. In steps 281 and 282, a negative determination and an affirmative determination are made, respectively, and in step 283, the target braking pressure Pbti of the relevant wheel is set to the master cylinder pressure Pm. In steps 300 and 310, the braking pressure Pbi of the relevant wheel is controlled so as to become the target braking pressure Pbti (=Pm), thereby preventing the braking pressure Pbi of the relevant wheel from becoming zero due to the braking force control by the anti-skid control being continued. The braking pressures of the other wheels are controlled to the master cylinder pressure Pm as in the case of B1-1.

<B2> when the Automatic Braking is being Performed
<B2-1> when the Braking Slip of the Relevant Wheel is not Excessive As in the case of A1-1 above, negative determinations are made in steps 230 and 240. Therefore, in step 260, the target braking pressure Pati for the automatic braking of the relevant wheel is calculated based on the target deceleration of the vehicle for the automatic braking by the automatic driving control, and the downstream braking actuator 14 is controlled so that the braking pressure Pbi of the relevant wheel becomes the corresponding target braking pressure Pati.

<B2-2> the Braking Slip of the Relevant Wheel is Excessive but the Relevant Wheel is not Long-Time Locked As in the case of B1-2 above, steps 270 to 310 are executed. In steps 281, 284 and 286, an affirmative determination, an affirmative determination and a negative determination are made, respectively, and in step 290, the target braking pressure Pbti of the relevant wheel is set to the target braking pressure Pabsi of the relevant wheel. In steps 300 and 310, the braking pressure Pbi of the relevant wheel is controlled so as to become the target braking pressure Pbti (=Pabsi), thereby reducing the braking slip of the relevant wheel. The braking pressures of the other wheels are controlled so as to become the corresponding target braking pressures Pati as in the case of B2-1.

<B2-3> when the Braking Slip of the Relevant Wheel is Excessive and the Relevant Wheel is Long-Time Locked As in the case of B1-2 above, steps 270 to 310 are executed. Further, affirmative determinations are made in steps 281, 284 and 286.

<B2-3-1> when the Target Upstream Pressure Put is not the Target Braking Pressure Pbti of the Relevant Wheel When the target upstream pressure Put determined according to the above equation (1) is not the target braking pressure Pbti of the relevant wheel, a negative determination is made in step 287 and an affirmative determination is made in step 288.

When a wheel speed Vwi of a wheel on the laterally opposite side to the relevant wheel is larger than the reference value Vw0, a negative determination is made in step 288, and in step 289, the target braking pressure Pbti of the relevant wheel is set to the target upstream pressure Pau for the automatic braking. On the other hand, when a wheel speed Vwi of a wheel on the laterally opposite side to the relevant wheel is equal to or less than the reference value Vw0, an affirmative determination is made in step 288, and in step 290, the target braking pressure Pbti of the relevant wheel is set to the target braking pressure Pabsi for the anti-skid control of the relevant wheel.

In both cases where a wheel speed Vwi of a wheel on the laterally opposite side to the relevant wheel is equal to or less than the reference value Vw0 and larger than the reference value Vw0, in steps 300 and 310, the braking pressure Pbi of the relevant wheel is controlled so as to become the target braking pressure Pbti, thereby reducing the braking slip of the relevant wheel. The braking pressures of the other wheels are controlled so as to become the corresponding target braking pressure Pati for the automatic braking as in the case of B2-1.

Figure 5:
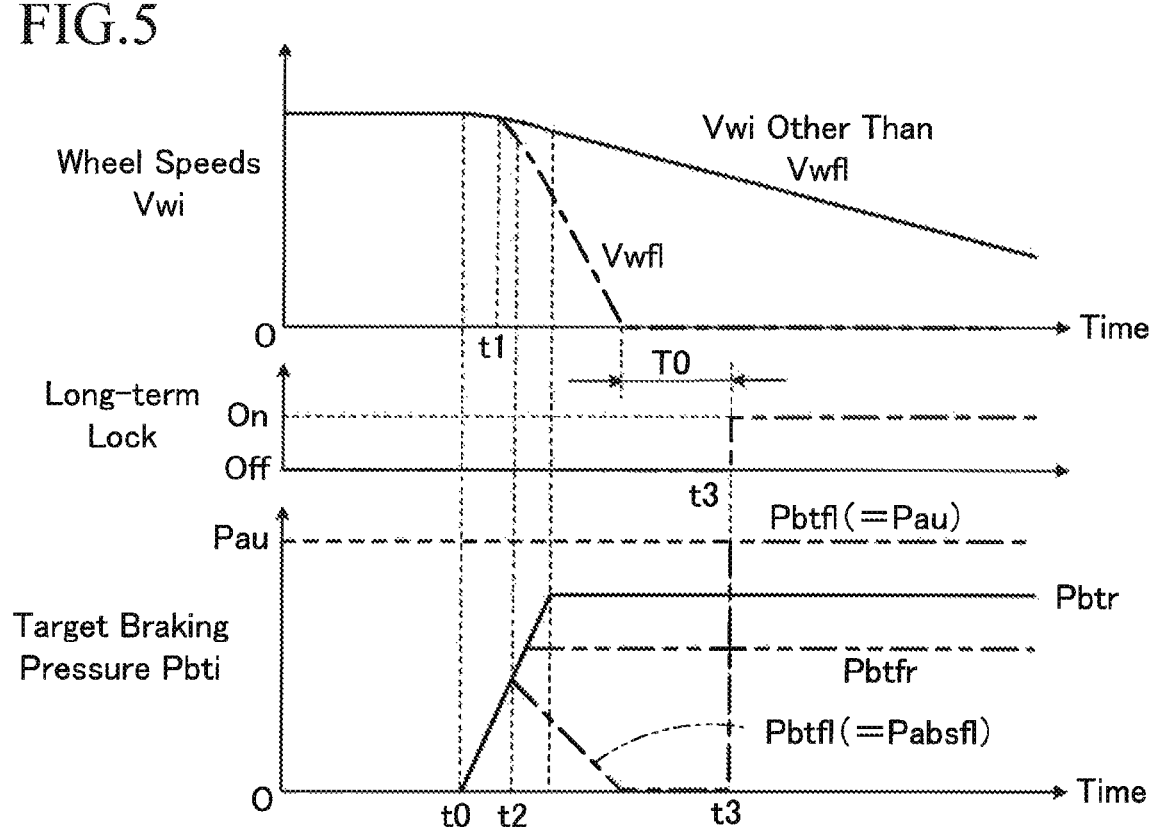
FIG. 5 is a time chart which shows an example in which a target braking pressure Pbtfl of a left front wheel becomes a target upstream pressure Pau of automatic braking when a wheel speed sensor of the left front wheel becomes abnormal and a long-time lock is determined in a situation where a vehicle is decelerated by the automatic braking.
Figure 6:
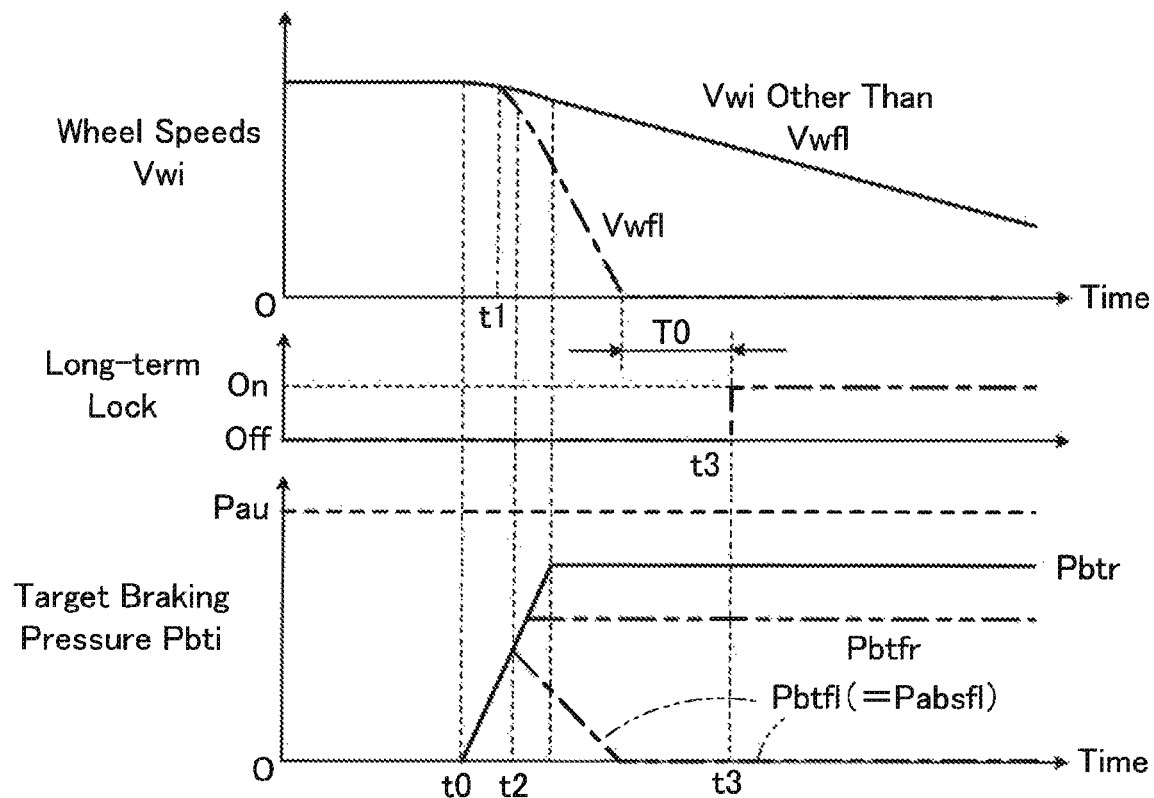
FIG. 6 is a time chart which shows an example in which a target braking pressure Pbtfl of the left front wheel is set to a target braking pressure Pabsfl of anti-skid when a wheel speed sensor of the left front wheel becomes abnormal and it is determined the wheel is long-time locked in a situation where the vehicle is decelerated by the automatic braking.

As a typical example of the case B2-3-1, control of the target braking pressure Pbtfl of the left front wheel is considered which is executed when, as shown in FIGS. 5 and 6, the wheel speed sensor of the left front wheel becomes abnormal in a situation where the vehicle is decelerated at a constant deceleration by the automatic braking.

It is to be noted that although the target braking force for the rear wheels is generally lower than the target braking force for the front wheels, in FIGS. 5 and 6 and FIGS. 7 and 8 described later, the target braking pressure for the rear wheels is higher than the target braking pressure for the front wheels. This is because a cross-sectional area of the wheel cylinders of the rear wheels is smaller than a cross-sectional area of the wheel cylinders of the front wheels. Further, in FIGS. 5 to 8, "off" and "on" for the long-time lock means that the wheel is not long-time locked and the wheel is long-time locked, respectively.

It is assumed that automatic braking starts at time point t0, the wheel speed sensor of the left front wheel becomes abnormal at time point t1, and a detected wheel speed Vwfl gradually decreases to zero. It is assumed that it is determined that the start condition of the anti-skid control is satisfied and the end condition is not satisfied for the left front wheel at time point t2, and it is determined that the left front wheel is long-time locked at or after time point t3. It is further assumed that the target braking pressure Pbtfl of the left front wheel starts to decrease at time point t2 and finally becomes zero. The above assumptions are the same in FIGS. 7 and 8 described later.

In the section from time point t2 to time point t3, the target braking pressure Pbtfr of the right front wheel is higher than the target braking pressure Pbtfl of the left front wheel and lower than the target braking pressure Pbtr (=Pbtrl=Pbtrr) of the rear wheels. Therefore, the target upstream pressure Put determined according to the above-described equation (1) is determined to the target braking pressure Pbtfr of the right front wheel, which is an appropriate value as the target upstream pressure.

After the time point t3, an affirmative determination is made in step 286. Therefore, if the determination in step 287 is not performed, the target braking pressure Pbtfl of the left front wheel is set to the target upstream pressure Pau as shown in FIG. 5. As a result, the higher one of the target braking pressures of the left and right front wheels becomes the target braking pressure Pbtfl (=Pau) of the left front wheel, and the target braking pressure of the left front wheel is higher than the target braking pressure Pbtr of the rear wheels. Accordingly, the target upstream pressure Put determined according to the above-described equation (1) is determined to the rear wheel braking pressure Pbtr lower than the target upstream pressure Pau, and the target upstream pressure Put cannot be determined to the target braking pressure Pbtfr of the right front wheel.

Note that the above-described problem also occurs when steps 286 and 287 are not executed. That is, the above-described problem occurs in a case where step 288 is executed when an affirmative determination is made in step 284.

On the other hand, according to the embodiment, when a negative determination is made in step 287 and a wheel speed Vwfr of the right front wheel is equal to or lower than the reference value Vw0, the target braking pressure Pbtfl of the left front wheel is set to the target braking pressure Pabsfl for the anti-skid control in step 290. Accordingly, as shown in FIG. 6, the higher one of the target braking pressures of the left and right front wheels is the target braking pressure Pbtfr of the right front wheel, so that even if it is determined that the left front wheel is long-time locked, the target upstream pressure Put can be continuously determined to the target braking pressure Pbtfr of the right front wheel.

Notably, according to the illustrated embodiment, the determination in step 288 is performed. Consequently, even if the target upstream pressure Put is not the target braking pressure Pbti of the relevant wheel, when a wheel speed Vwi of a wheel on the laterally opposite side to the relevant wheel is larger than the reference value Vw0, the target braking pressure Pbti of the relevant wheel is set to the target upstream pressure Pau of the automatic braking in step 289. Therefore, when the target upstream pressure Put is not the target braking pressure Pbti of the relevant wheel, it can more surely be avoided that the target braking pressure Pbti of the relevant wheel is set to the target braking pressure Pabsi of the anti-skid control uselessly as compared to where the determination of step 288 is not performed.

<B2-3-2> when the Target Upstream Pressure Put is the Target Braking Pressure Pbti of the Relevant Wheel When the target upstream pressure Put determined according to the above equation (1) is the target braking pressure Pbti of the relevant wheel, an affirmative determination is made in step 287. As a result, in step 289, the target braking pressure Pbti of the relevant wheel is set to the target upstream pressure Pau of the automatic braking, and in steps 300 and 310, the braking pressure Pbi of the relevant wheel is controlled so as to become the target braking pressure Pbti (=Pau). The braking pressures of the other wheels are controlled so as to become the corresponding automatic braking target braking pressure Pati as in the case of B2-1.

Figure 7:
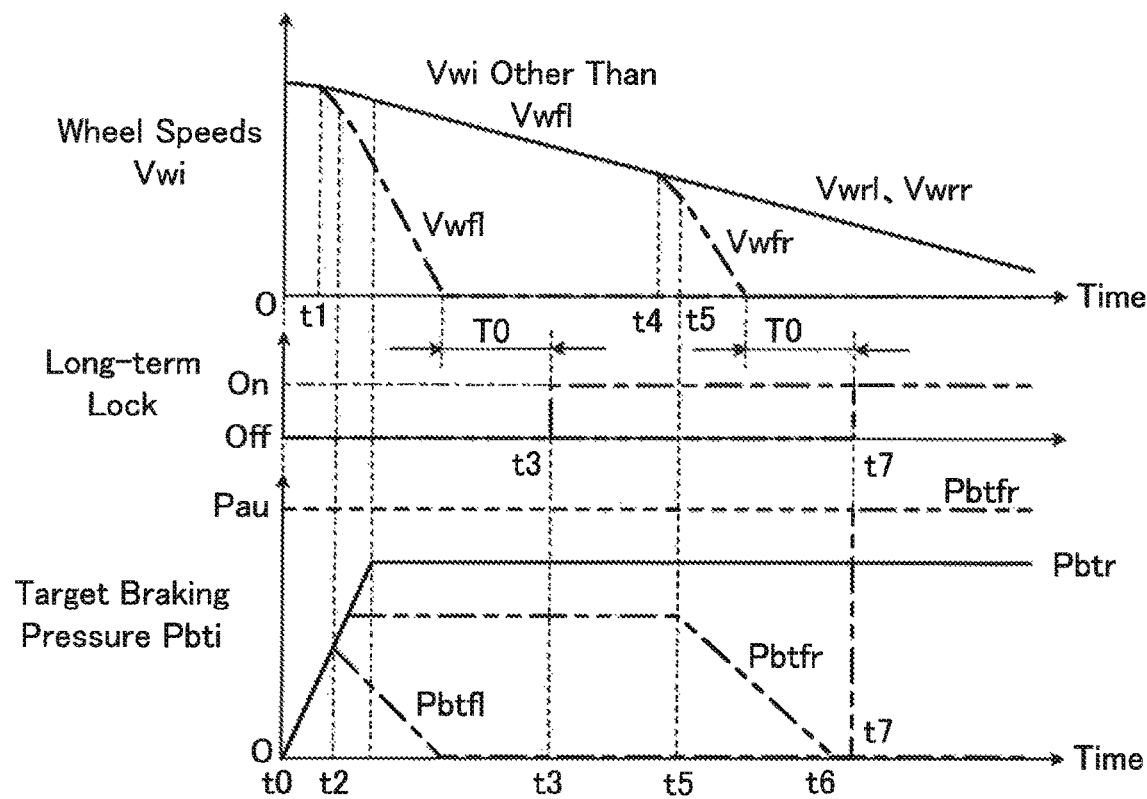
FIG. 7 is a time chart which shows an example of change of a target braking pressure Pbtfr of the right front wheel in which a reference value for determining the long-time lock is not reduced in a case where a wheel speed sensor of the left front wheel becomes abnormal and then the right front wheel becomes locked in a situation where the vehicle is decelerated by the automatic braking.
Figure 8:
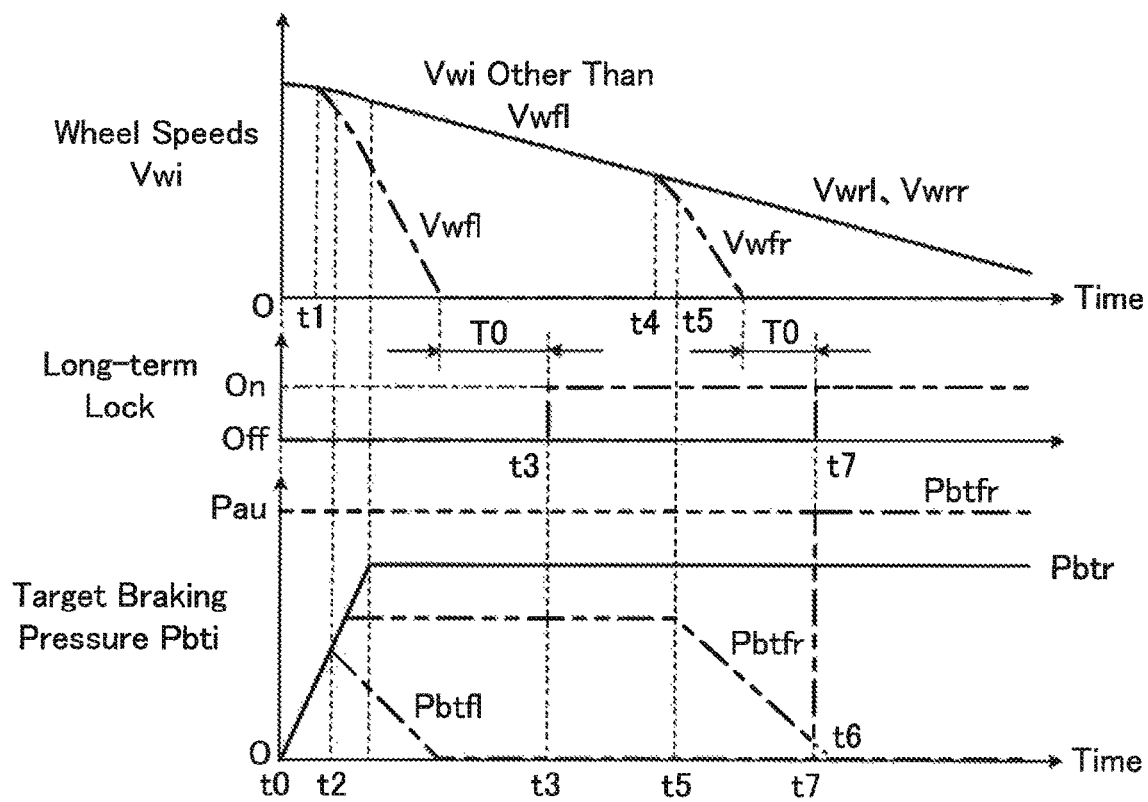
FIG. 8 is a time chart which shows an example of change of a target braking pressure Pbtfr of the right front wheel in the embodiment in which a reference value for determining the long-time lock is reduced in a case where a wheel speed sensor of the left front wheel becomes abnormal and then the right front wheel becomes locked in a situation where the vehicle is decelerated by the automatic braking.

As a typical example of the case B2-3-2, control of the target braking pressure Pbtfr of the right front wheel is considered which is executed when, as shown in FIGS. 7 and 8, the wheel speed sensor of the left front wheel becomes abnormal in a situation where the vehicle is decelerated at a constant deceleration by the automatic braking and thereafter the right front wheel is locked. The same applies when the wheel speed sensor of the right front wheel becomes abnormal in a situation where only the left front wheel is locked, or when the right front wheel is also locked.

As shown in FIGS. 7 and 8, it is assumed that the right front wheel reaches a road surface having a low friction coefficient at time point t4 after time point t3, and the wheel speed Vwfr gradually decreases to zero. It is also assumed that it is determined that the start condition of the anti-skid control is satisfied for the right front wheel at time point t5, and it is determined that the right front wheel is also long-time locked at or after time point t7. The target braking pressure Pbtfr of the right front wheel starts to decrease at time point t5.

As shown in FIG. 7, even if it is determined that a wheel on the laterally opposite side to the relevant wheel is long-time locked, when the reference value T0 for the long-time lock determination in step 286 is the standard value, the target braking pressure Pbtfr of the right front wheel becomes zero at time point t6. The time point t7 at which it is determined that the right front wheel is long-time locked is later than the time point t6, and the target braking pressures Pbtfl and Pbtfr of the left and right front wheels become zero in the section from the time point t6 to the time point t7. As a result, the target upstream pressure Put determined according to the above equation (1) also inevitably becomes zero.

On the other hand, according to the embodiment, since the reference value T0 for determining the long-time lock is set to a value smaller than the standard value in step 286, it is determined that the right front wheel is long-time locked at time point t7 before time point t6 at which the target braking pressure Pbtfr of the right front wheel becomes zero. As a result, the target braking pressure Pbtfr of the right front wheel does not become zero, and is set to the target upstream pressure Pau of the automatic braking after time point t7. Therefore, it is possible to prevent the target upstream pressure Put determined according to the above-described equation (1) from becoming zero, and at least to reduce the possibility that the target upstream pressure Put becomes zero.

It is to be noted that although in the examples shown in FIGS. 5 to 8, the target deceleration for the automatic braking is constant for convenience of explanation, according to the embodiment, the same effect as the above-mentioned effect can be obtained even when the target deceleration for the automatic braking changes.

<C. When the Downstream Braking Actuator 14 is in Another Abnormality>

In Steps 40 and 60, negative determinations are made, and in Step 80, the upstream braking actuator 12 is controlled in the non-control mode. Therefore, it is possible to ensure a situation in which the wheel cylinders 76FL to 76RR are connected with the master cylinder device 18 as much as possible such that the braking pressures of the other wheels becomes the master cylinder pressure Pm, and the braking forces of the other wheels change corresponding to an amount of braking operation performed by the driver.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, the reference value T0 for determining the long-time lock in step 286 is set to a value smaller than the standard value when it is determined that a wheel on the laterally opposite side to the relevant wheel is long-time locked. However, the reference value T0 for determining the long-time lock may be the standard value even if it is determined that a wheel on the laterally opposite side to the relevant wheel is long-time locked.

In the above-described embodiment, when the target upstream pressure Put is not the target braking pressure Pbti of the relevant wheel, the determination in step 288 is performed, and when it is determined that a wheel speed Vwi of a wheel on the laterally opposite side to the relevant wheel is equal to or less than the reference value Vw0, the downstream control proceeds to step 290. However, the determination in step 288 may be omitted, and when the target upstream pressure Put is not the target braking pressure Pbti of the relevant wheel, the downstream control may proceed to step 290.

In the above-described embodiment, in step 270, the target braking pressure Pabsi of the anti-skid control of the control target wheel is calculated, and the downstream braking actuator 14 is controlled so that the braking pressure Pbi of the relevant wheel becomes the target braking pressure Pabsi. However, a control mode and a target increasing/decreasing gradient of the braking pressure for setting the braking slip ratio to a value within the predetermined range may be determined based on the braking slip ratio SLi of the control target wheel, and a target braking pressure Pbti may be calculated based on the control mode and the increasing/decreasing gradient.

In the above-described embodiment, the upstream braking actuator 12 and the downstream braking actuator 14 are controlled by the electronic control unit 16. However, the upstream braking actuator 12 and the downstream braking actuator 14 may individually be controlled by inherent electronic units. In that case, the control of the upstream pressure according to the flowchart shown in FIG. 2 may be performed by an electronic control unit for the upstream braking actuator 12, and the control of the braking pressures according to the flowcharts shown in FIGS. 3 and 4 may be performed by an electronic control unit for the downstream braking actuator 14.

Further, the above-described embodiment is applied to a vehicle in which a target braking force of the rear wheels is lower than a target braking force of the front wheels and a target braking pressure of the rear wheels is higher than a target braking pressure of the front wheels. However, the braking force control apparatus of the present disclosure may be applied to a vehicle such as a truck in which a target braking force of the rear wheels is higher than a target braking force of the front wheels and a target braking pressure of the rear wheels is lower than a target braking pressure of the front wheels. In that case, the control of the braking pressures of the front wheels and the rear wheels may be performed similarly to the control of the braking pressures of the rear wheels and the front wheels, respectively in the above-described embodiment.

What is claimed is:

1. A braking force control apparatus for a vehicle which has an upstream braking actuator that includes a master cylinder device driven by braking operation of a driver and controls an upstream pressure common to left and right front wheels and left and right rear wheels, a downstream braking actuator that individually controls braking pressures supplied to braking force generators of the left and right front wheels and the left and right rear wheels using the upstream pressure, and a control unit that controls the upstream braking actuator and the downstream braking actuator;

the control unit is configured to normally control the upstream braking actuator such that the upstream pressure becomes a pressure in the master cylinder device, and control the downstream braking actuator such that braking pressures of the wheels become the upstream pressure;

the control unit is configured to, when an anti-skid control start condition is satisfied for any of the wheels, perform anti-skid control for controlling the downstream braking actuator such that the braking pressure of the relevant wheel becomes a target braking pressure of the anti-skid control for keeping a degree of braking slip of the relevant wheel within a predetermined range until an anti-skid control end condition is satisfied; and the control unit is configured to perform automatic braking control in which the control unit calculates a target upstream pressure for automatic braking and target braking pressures for automatic braking of the wheels when automatic braking is required, control the upstream braking actuator such that the upstream pressure becomes the target upstream pressure for automatic braking, and control the downstream braking actuator such that the braking pressures of the wheels become the corresponding target braking pressures for automatic braking, wherein the control unit is configured to, when a specific abnormality occurs in the downstream braking actuator in which the upstream pressure can be supplied from the upstream braking actuator to the braking force generators of the wheels but a braking pressure of any wheel cannot be reduced, perform backup control in which the control unit selects higher one of the target braking pressures of the left and right front wheels and higher one of the target braking pressures of the left and right rear wheels, determines the lower of the two selected target braking pressures as a backup target upstream pressure, and controls the upstream braking actuator such that the upstream pressure becomes the backup target upstream pressure, the control unit is configured to set the target upstream pressure to the backup target upstream pressure when performing the automatic braking control and the backup control, and the control unit is configured to, when performing anti-skid control in a situation where the automatic braking control is being performed, set a target braking pressure of a control target wheel of the anti-skid control to a target braking pressure of the anti-skid control, and the control unit is configured to, in a situation where the anti-skid control, the automatic braking control and the backup control are being performed and the control target wheel is long-time locked, set the target braking pressure of the control target wheel to be used for determining the target upstream pressure to the target upstream pressure when the target upstream pressure is the target braking pressure of the control target wheel, and set the target braking pressure of the control target wheel used for determining the target upstream pressure to the target braking pressure of the anti-skid control when the target upstream pressure is not the target braking pressure of the control target wheel.

2. The braking force control apparatus for a vehicle according to claim 1, wherein the control unit is configured to determine that the target wheel is long-time locked when the control unit performs the anti-skid control, the automatic braking control and the backup control and a time during which a wheel speed of the target wheel is zero is equal to or greater than a reference value, and decrease the reference value when determining whether or not the target wheel is long-time locked in a situation where a wheel on the laterally opposite side to the control target wheel is long-time locked.

* * * * *